(12) United States Patent
Schaus

(10) Patent No.: US 10,460,005 B2
(45) Date of Patent: Oct. 29, 2019

(54) DATA CONSUMPTION BETWEEN HETEROGENEOUS WEB APPLICATIONS

(71) Applicant: Martin Schaus, Nussloch (DE)

(72) Inventor: Martin Schaus, Nussloch (DE)

(73) Assignee: SAP SE, Walldorf (DE)

( * ) Notice: Subject to any disclaimer, the term of this patent is extended or adjusted under 35 U.S.C. 154(b) by 895 days.

(21) Appl. No.: 14/546,195

(22) Filed: Nov. 18, 2014

(65) Prior Publication Data
US 2016/0140251 A1 May 19, 2016

(51) Int. Cl.
| | |
|---|---|
| *G06F 17/00* | (2019.01) |
| *G06F 16/957* | (2019.01) |
| *H04L 29/08* | (2006.01) |
| *G06F 16/958* | (2019.01) |
| *G06F 16/955* | (2019.01) |

(52) U.S. Cl.
CPC ...... *G06F 16/9577* (2019.01); *G06F 16/9566* (2019.01); *G06F 16/986* (2019.01); *H04L 67/02* (2013.01)

(58) Field of Classification Search
CPC ................. G06F 17/30905; G06F 17/2247
See application file for complete search history.

(56) References Cited

U.S. PATENT DOCUMENTS

| | | | |
|---|---|---|---|
| 6,990,653 B1* | 1/2006 | Burd | G06F 17/30893 707/E17.117 |
| 6,996,800 B2* | 2/2006 | Lucassen | G06F 8/38 717/104 |
| 9,218,425 B2* | 12/2015 | Byers | G06F 17/30796 |
| 9,218,435 B2* | 12/2015 | Buttner | G06F 17/30899 |
| 2009/0049370 A1* | 2/2009 | Faris | G06F 17/30905 715/200 |

OTHER PUBLICATIONS

Shimomura, "A Page-Transition Framework for Image-Oriented Web Programming" ACM SIGSOFT Software Engineering Notes, vol. 29 No. 2, p. 1-9.*

* cited by examiner

*Primary Examiner* — Amelia L Tapp
(74) *Attorney, Agent, or Firm* — Buckley, Maschoff & Talwalkar LLC

(57) ABSTRACT

A system includes reception of first Web application code for a first Web page from a first Web server, reception of second Web application code for the first Web page from a second Web server, execution of the first Web application code to register a first data model in a container of the first Web page, and execution of the second Web application to query the container of the first Web page for data models, request the first data model from the container, receive the first data model from the container, extract first data from the first data model, and present the first data in the first Web page.

17 Claims, 8 Drawing Sheets

DATA CONSUMPTION BETWEEN HETEROGENEOUS WEB APPLICATIONS

BACKGROUND

A Web browser receives a HyperText Markup Language (HTML) file from a Web server, parses the file to determine a layout and contents of a corresponding Web page, and displays the Web page. Conventional Web browsers are also capable of executing scripts embedded in Web pages and/or application code received from Web servers. Such application code may be referred to as a Web application.

A Web page may include two or more Web applications received from different sources. Each Web application displays corresponding data in its allocated portion of the Web page. The Web applications are standalone entities which do not operate in conjunction with one another, and therefore are unable to share data with one another.

A Web application may attempt to acquire data associated with another Web application of a same Web page by parsing the HTML code of the Web page. This technique is inefficient, inaccurate, and limited to acquisition of visible data. Improved integration between disparate Web applications executing within a same Web page is desired.

DETAILED DESCRIPTION

Some embodiments provide for provision and consumption of data among Web applications executing within a Web page. The data of a Web application may be exposed and consumed as a data model. The data model may be known or may describe itself according to some embodiments.

Figure 1:
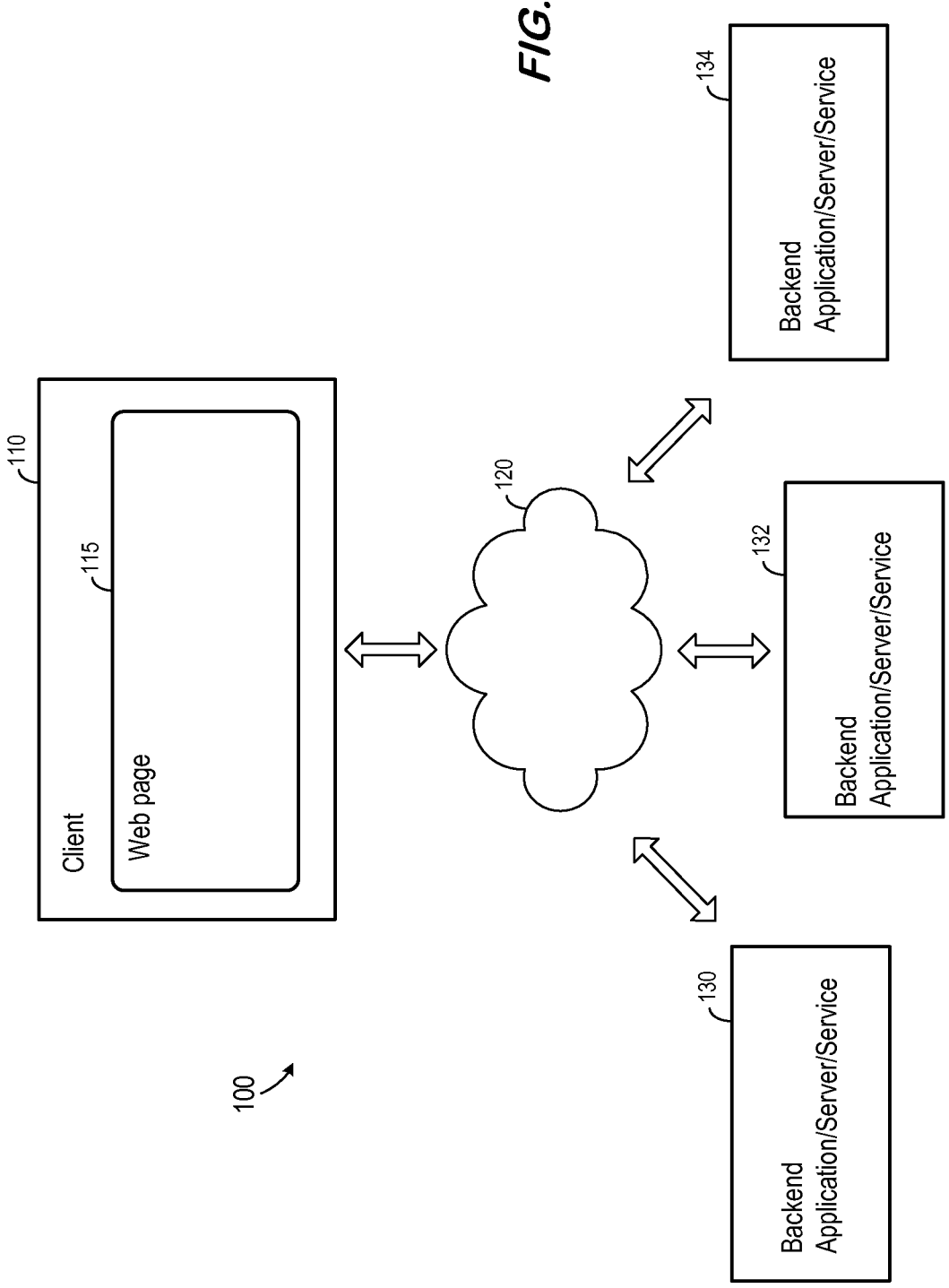
FIG. 1 is a block diagram of a system according to some embodiments.

FIG. 1 is a block diagram of system 100 according to some embodiments. System 100 includes client 110, network 120, and backend applications/servers/services 130-134. Generally, client 110 requests data from backend applications/servers/services 130-134 via network 120, receives data therefrom via network 120, and presents the data to a user.

Client 110 may comprise any client application configured to communicate with from backend applications/servers/services 130-134 via any protocol that is or becomes known. According to some embodiments, client 110 is a Web browser and each of backend applications/servers/services 130-134 implements a Web server and/or otherwise provides Web services. Client 110 may comprise a proprietary dedicated application for communicating with backend applications/servers/services 130-134.

Network 120 may comprise the World Wide Web, as well as any intermediary computing networks lying between the World Wide Web and client 110, and between the World Wide Web and backend applications/servers/services 130-134. Such intermediary computing networks may be private, public, or any combination thereof.

Backend applications/servers/services 130-134 may be implemented by one or more entities (e.g., a corporation, a public source, a Software-as-a-Service provider). According to some embodiments, each of backend applications/servers/services 130-134 may provide one or more Web application to client 110 upon request.

In operation, client 110 requests a Web page using a Uniform Resource Locator (URL) associated with a page stored on a Web server. The Web server may be implemented by one of backend applications/servers/services 130-134 or by another unshown computing system. FIG. 1 illustrates reception of resulting Web page 115 by client 110.

Next, client 110 parses Web page 115 and requests one or more Web applications (three in the present example) specified as URLs in page 115. The URLs may reference Web applications stored by one or more of backend applications/servers/services 130-134. The Web applications are executable within the container of Web page 115, and may comprise javascript files, CSS files or any other file types.

Figure 2:
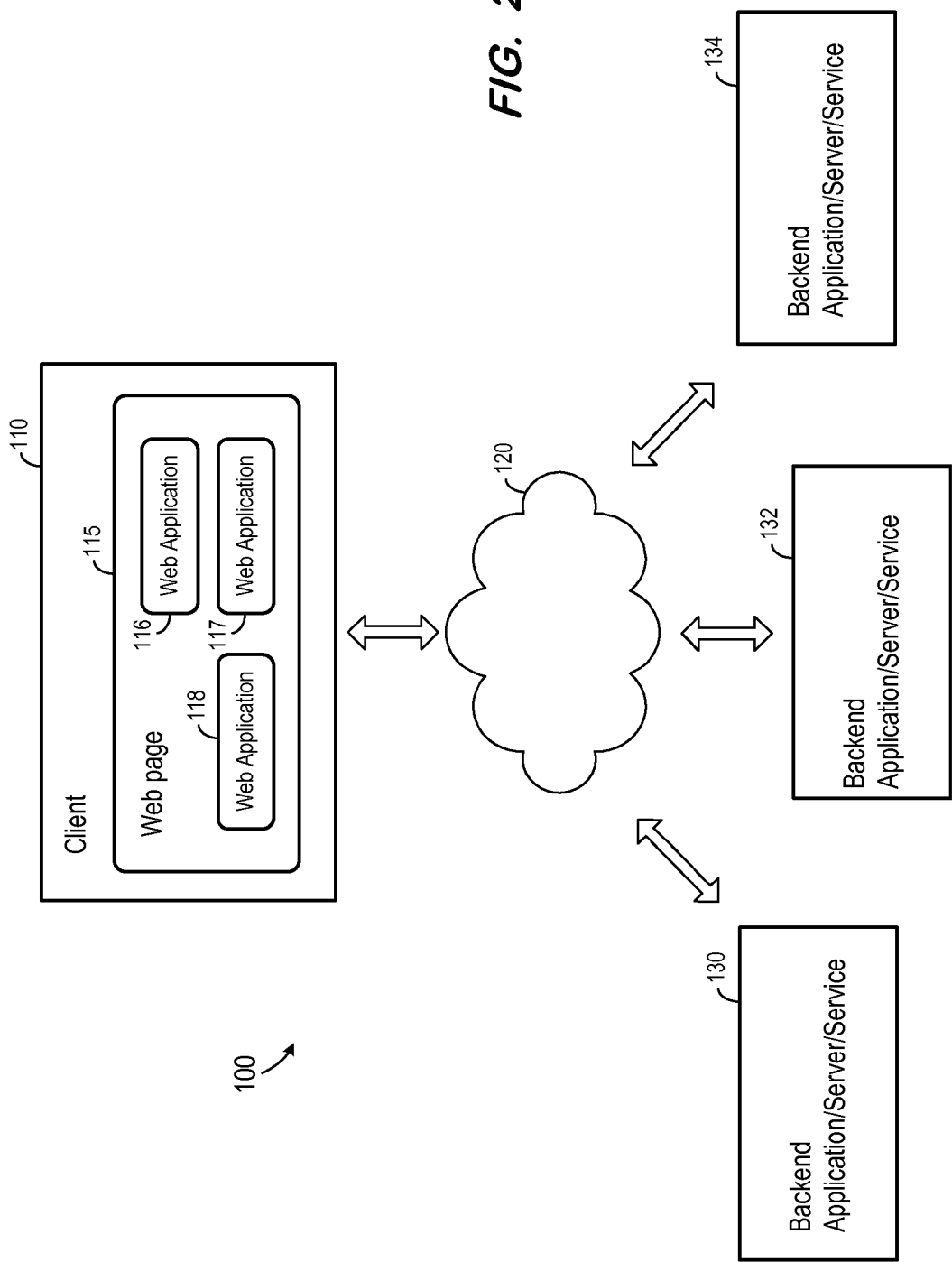
FIG. 2 is a block diagram of a system according to some embodiments.

FIG. 2 shows Web applications 116-118 executing within Web page 115. As described above, each of Web applications 116-118 displays information within an allocated portion of Web page 115. This information may include data which is retrieved from remote sources as a result of execution of Web applications 116-118. As will be described in detail below, some embodiments provide consumption of data retrieved by one of Web applications 116-118 by another of Web applications 116-118.

According to some embodiments, a Web application operates in conjunction with a User Interface (UI) framework. A UI framework consists of code libraries providing methods (e.g., drag and drop, pull-down menus, etc.) which mimic the functionality of an operating system. A developer utilizes these pre-existing code libraries in order to facilitate development of a Web application.

Figure 3:
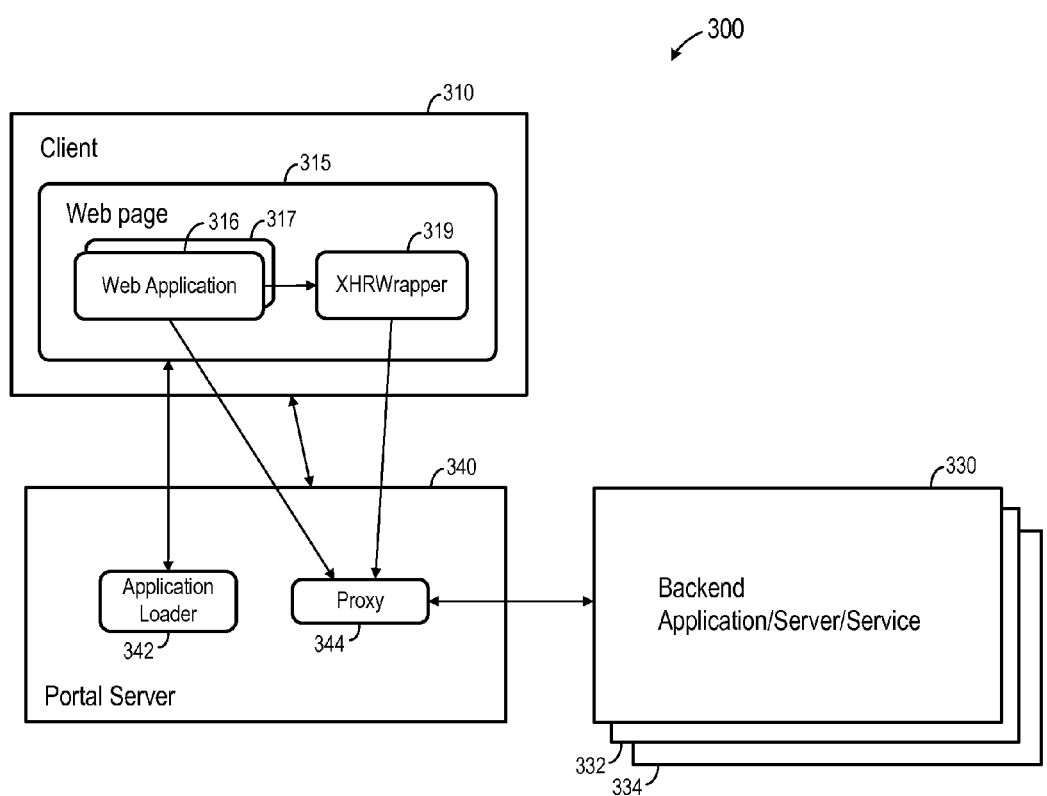
FIG. 3 is a block diagram of a system according to some embodiments.

FIG. 3 illustrates a portal-based architecture according to some embodiments. Portals provide Web clients with a single point of entry to disparate backend applications, servers and/or services. As described above, the backend applications, servers and/or services may be implemented by one or more entities (e.g., a corporation, a public source, a Software-as-a-Service provider).

Portal server 340 includes proxy 344 and application loader 342. As a security-based limitation, client 310 is blocked from making HTTP requests to servers other than the server from which a current page is loaded. Proxy 344 is intended to address this limitation. Proxy 344 may receive HTTP requests from client 310 and redirect those requests to one of resources 330-334 based on information contained in the request.

While parsing Web page 315, a requests to proxy 344 may include requests for Web applications 316 and 317. Application loader 342 acquires application code of the requested applications and parses the application code to convert all URLs within the application code to URLs associated with proxy 344. For example, a URL within the acquired application code may refer to one of applications/servers/services 330-334, and application loader 342 changes this URL to a URL of proxy 344. The new URL may indicate the referredto one of applications/servers/services 330-334. Application loader 342 then provides the changed Web application 316, 317 to client 310.

During execution, Web application 316, for example, may call one of the changed URLs, which results in transmission of a request to proxy 344. Proxy 344 may then forward a corresponding request to a backend location indicated by the changed URL. Web page 315 also includes XHRWrapper 319. In a case that execution of Web application 316 or 317 generates and calls a URL which was not explicitly specified in Web application 316 or 317 (i.e., an AJAX call), XHRWrapper 319 overrides the native XMLHttpResponse function of client 310 to direct this call to proxy 344 as illustrated.

Figure 4:
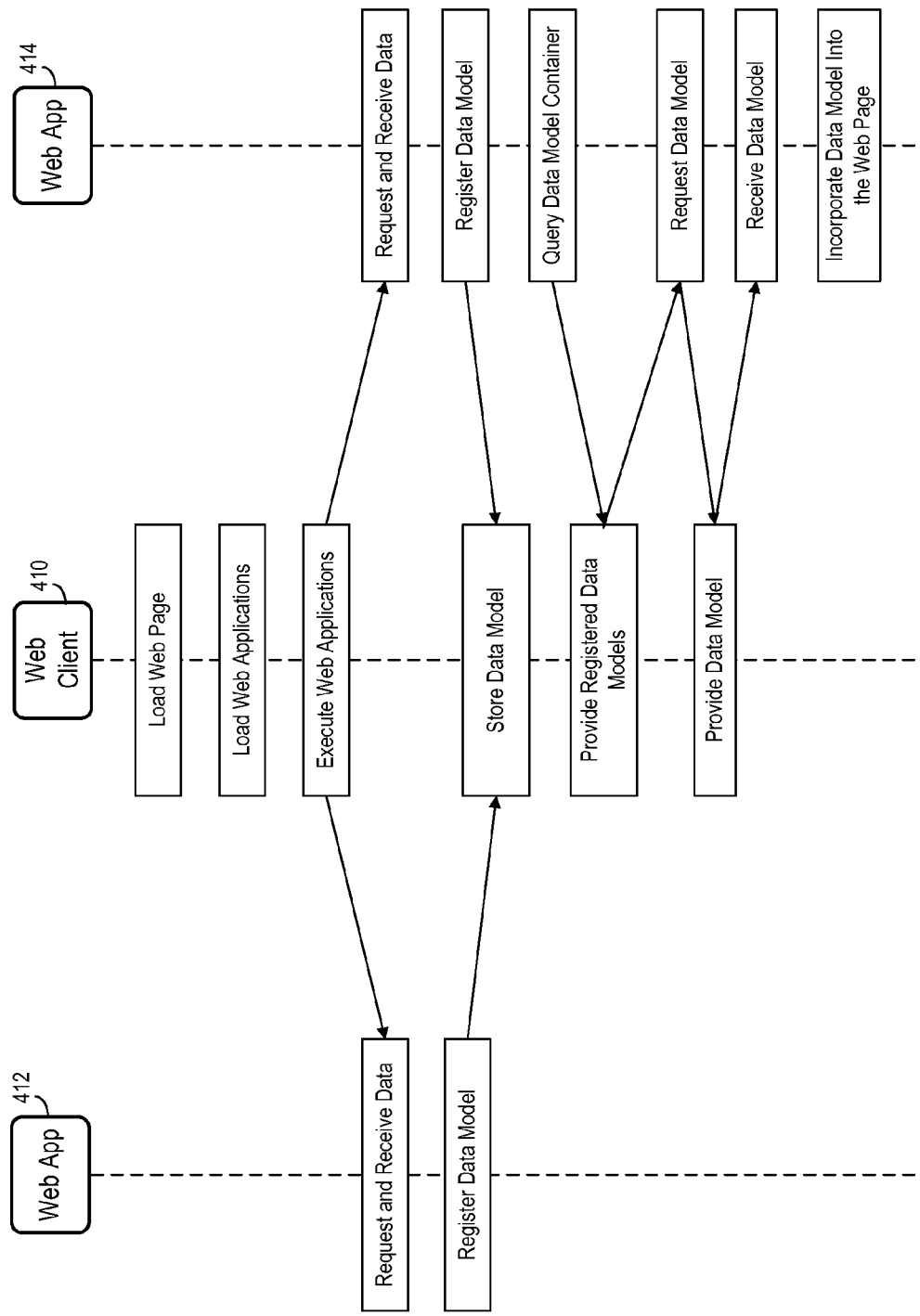
FIG. 4 is a sequence diagram according to some embodiments.

FIG. 4 comprises a sequence diagram according to some embodiments. In some embodiments, various hardware elements of a client device (e.g., a desktop computer, a laptop computer, a tablet computer, a smartphone) execute program code to perform the illustrated steps. In some embodiments, hard-wired circuitry may be used in place of, or in combination with, program code for implementation of processes according to some embodiments. Embodiments are therefore not limited to any specific combination of hardware and software.

Initially, Web client 410 receives and loads a Web page. Web client 410 may comprise a Web browser as described above, and the Web page may be received from any suitable Web server in response to a request issued by Web client 410. Loading the Web page may comprise parsing the HTML code of the Web page to determine layout and content to be displayed as well as any additional components to be loaded.

For purposes of the present example, it will be assumed that the Web page specifies two Web applications for execution within the Web page. Accordingly, as described above, Web client 410 issues a request for the two Web applications using corresponding URLs specified in the Web page. The URLs may directly identify a location of the Web applications or may specify a proxy as described with respect to FIG. 3.

Web client 410 then receives, loads and executes Web applications 412 and 414. Web applications 412 and 414 execute within the container of the Web page to request and receive data from remote sources. According to some embodiments, each of Web applications 412 and 414 also register a respective data model within the Web page.

Figure 5:
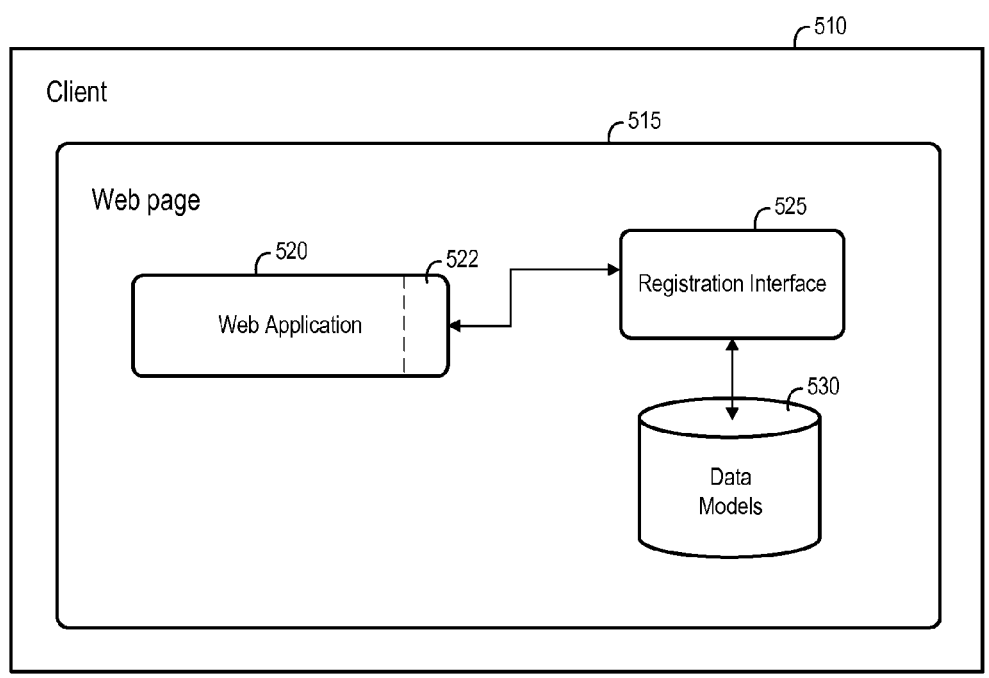
FIG. 5 is a block diagram of a system according to some embodiments.

FIG. 5 depicts data model registration according to some embodiments. Per the FIG. 4 diagram, client 510 has loaded Web page 515 and associated Web application 520. In this regard, loading and execution of multiple Web applications need not occur simultaneously according to some embodiments. Also, according to some embodiments, one or more Web applications loaded by Web client 410 might not register any data model. Similarly, one or more Web applications loaded by Web client 410 might not query a container for data models.

Web application 520 includes code 522 for registering a data model of Web application 520 within Web page 515. Code 522 interfaces with registration interface 525 of Web page 515 to instantiate its data model within data model container 530. Client 510 may provide a general implementation of registration interface 525 according to some embodiments. According to some embodiments, registration of the data model by Web application 520 may include generating HTML code of Web page 515 which includes a tag identifying data of the data model (e.g., <webappdata>"John", "Doe", "123 Main Street", "U.S.A."</webappdata>). Another Web application may therefore parse the HTML code to acquire this data. Code 522 may be made publicly available in order to facilitate data model registration by Web applications developed by different vendors.

Figure 6:
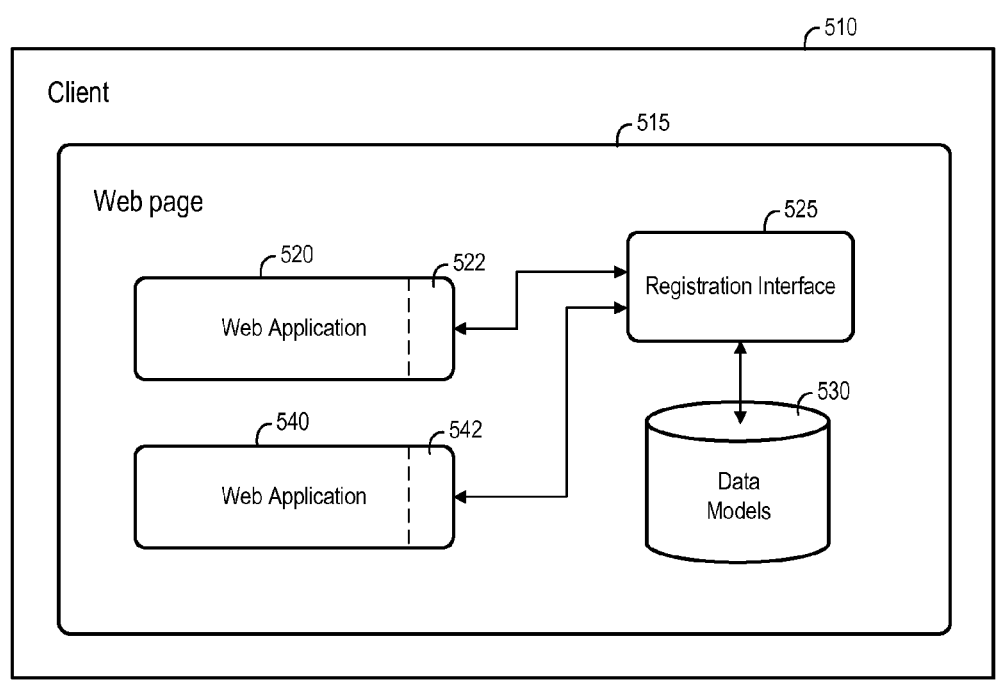
FIG. 6 is a block diagram of a system according to some embodiments.

Next, as shown in FIG. 6, client 510 loads Web application 540. Web application 540 includes code 542 for interfacing with registration interface 525 to register its data model. According to some embodiments, a data model may comprise a javascript object, an eXtended Markup language file, an ODATA object, etc. A data model may, in some embodiments, provide metadata describing its data.

Returning to FIG. 4, Web application 414 queries a data model container (e.g., container 530) for registered data models. Web client 410 provides an indication of registered data models in response. Further, according to the present example, Web application 414 requests one of the registered data models (e.g., the data model registered by Web application 412) from Web client and receives the data model in return. The data model may include data received by another Web application, and either displayed or not displayed (in contrast to the prior systems described in the Background) by the other Web application.

Web application 414 may incorporate and present data of the received data model within the Web page. More specifically, Web application 414 may present the data of the received data model within its allocated area of the Web page, and also in conjunction with data natively retrieved by Web application 414.

Figure 7:
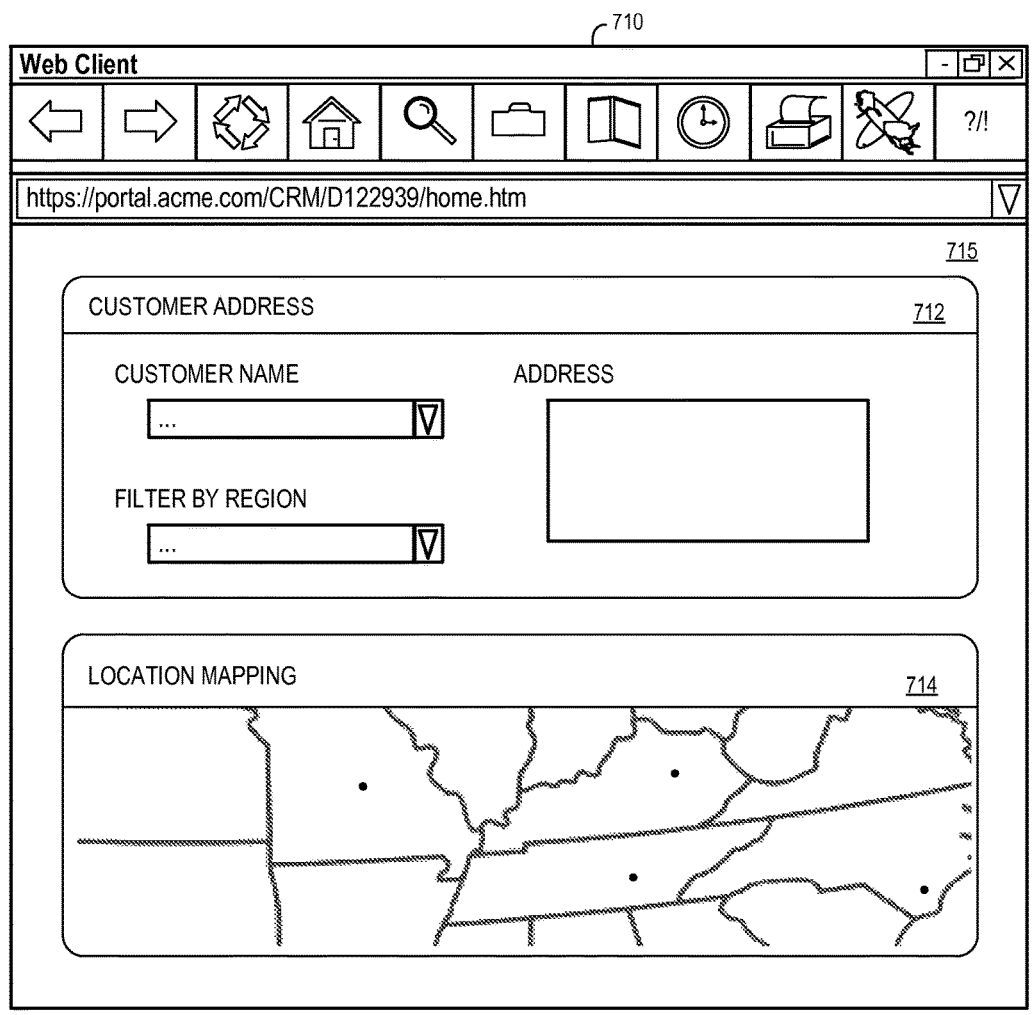
FIG. 7 is an outward view of a displayed Web page according to some embodiments.

FIG. 7 illustrates Web page 715 displayed by Web browser 710 according to some embodiments. Web page 715 includes areas 712 and 714 controlled by Web applications 412 and 414, respectively. According to some embodiments, Web application 412 provides address information associated with Customer Name and/or Region. As such, Web application 412 receives address data and registers an address data model according to some embodiments.

Web application 414 is, for example, a mapping application. In the present example, Web application 414 receives address data from the data model registered by Web application 412 and displays the addresses via icons on a map. Notably, the address data received by Web application 414 and incorporated into Web page 715 thereby might not be visible in the area of Web page 715 associated with Web application 412. Embodiments are not limited to the example of FIG. 7.

Figure 8:
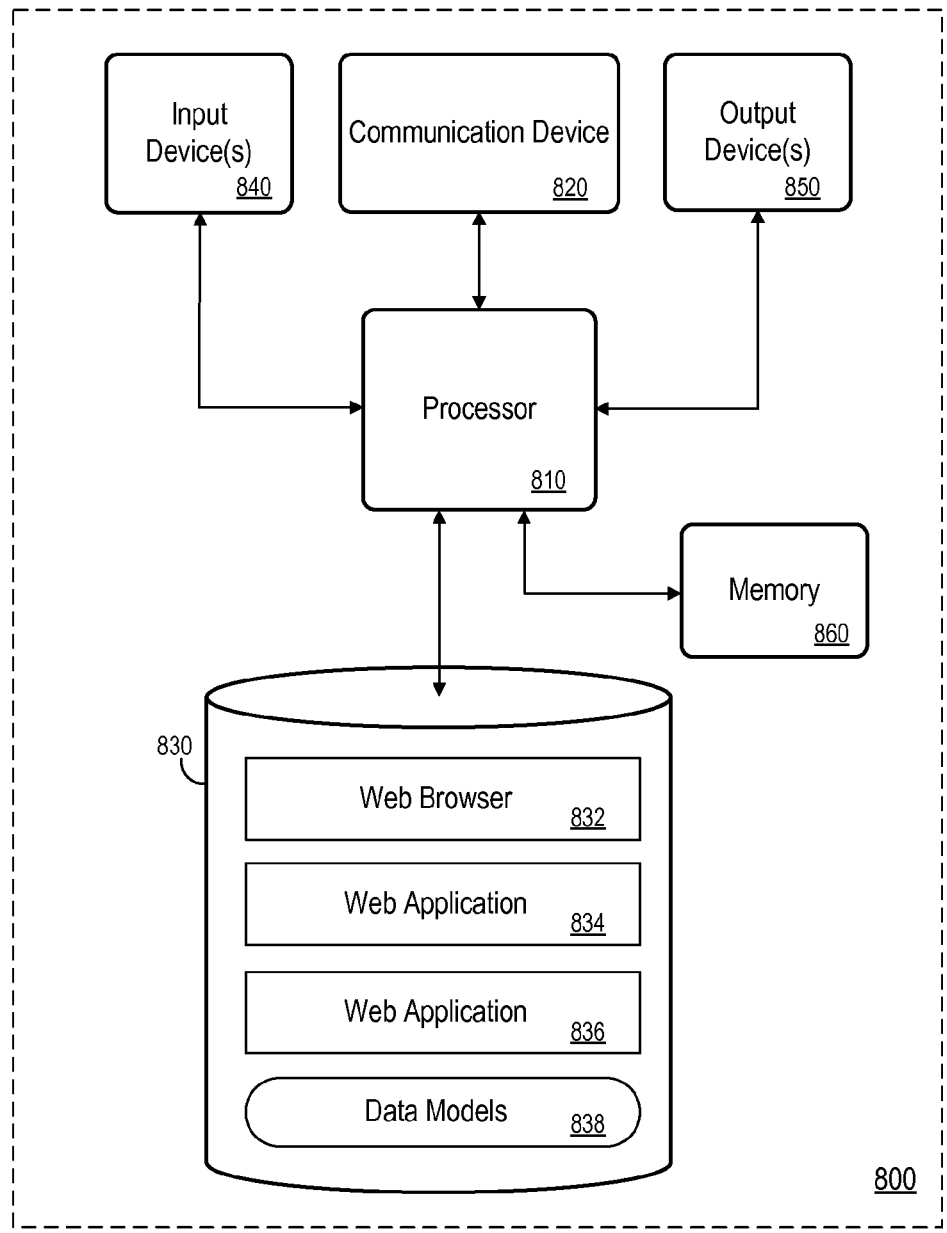
FIG. 8 is a block diagram of a computing device according to some embodiments.

FIG. 8 is a block diagram of apparatus 800 according to some embodiments. Apparatus 800 may comprise a general-purpose computing apparatus and may execute program code to perform any of the functions described herein. Apparatus 800 may comprise an implementation of one or more elements of client 110. Apparatus 800 may include other unshown elements according to some embodiments.

Apparatus 800 includes processor 810 operatively coupled to communication device 820, data storage device 830, one or more input devices 840, one or more output devices 850 and memory 860. Communication device 820 may facilitate communication with external devices. Input device(s) 840 may comprise, for example, a keyboard, a keypad, a mouse or other pointing device, a microphone, knob or a switch, an infra-red (IR) port, a docking station, and/or a touch screen. Input device(s) 840 may be used, for example, to manipulate graphical user interfaces and to input information into apparatus 800. Output device(s) 850 may comprise, for example, a display (e.g., a display screen) a speaker, and/or a printer.

Data storage device 830 may comprise any device, including combinations of magnetic storage devices (e.g., magnetic tape, hard disk drives and flash memory), optical storage devices, Read Only Memory (ROM) devices, etc., while memory 860 may comprise Random Access Memory (RAM).

Web browser 832, Web application 834 and Web application 836 of data storage device 830 may comprise program code executable by processor 810 to provide any of the functions described herein. Data models 838 may comprise data models registered by and consumed by Web applications as described herein. Data storage device 830 may also store data and other program code for providing additional functionality and/or which are necessary for operation thereof, such as device drivers, operating system files, etc.

The above-described diagrams represent logical architectures according to some embodiments, and actual implementations may include more or different logical elements arranged in other manners. Each logical element may be implemented by computing hardware and/or by program code executed by one or more processors of one or more computing devices in communication with one another via any number of other public and/or private networks. Two or more of such computing devices of may be located remote from one another and may communicate with one another via any known manner of network(s) and/or a dedicated connection. Each computing device may comprise any number of hardware and/or software elements suitable to provide the functions described herein as well as any other functions. For example, any computing device used in an implementation may include a processor to execute program code such that the computing device operates as described herein.

All systems and processes discussed herein may be embodied in program code stored on one or more computer-readable non-transitory media. Such media non-transitory media may include, for example, a fixed disk, a floppy disk, a CD-ROM, a DVD-ROM, a Flash drive, magnetic tape, and solid state RAM or ROM storage units. Embodiments are therefore not limited to any specific combination of hardware and software.

The embodiments described herein are solely for the purpose of illustration. Those in the art will recognize other embodiments may be practiced with modifications and alterations.

What is claimed is:

1. A system comprising:
   a memory storing processor-executable program code; and
   a processor to execute the processor-executable program code in order to cause the computing system to:
   receive first Web application code for a first Web page, the first Web application configured to display information within a first allocated portion of the first Web page;
   receive second Web application code for the first Web page, the second Web application configured to display information within a second allocated portion of the first Web page;
   execute the first Web application code to:
   register a first data model in a container of the first Web page; and
   execute the second Web application to:
   query the container registered by the first Web application for data models;
   request the first data model from the container;
   receive the first data model from the container;
   extract first data from the first data model; and
   present the first data in the second allocated portion of the first Web page.

2. A system according to claim 1, wherein the processor is to further execute the first Web application code to:
   receive the first data to populate the first data model.

3. A system according to claim 1, wherein the processor is to further execute the second Web application to:
   register a second data model in the container.

4. A system according to claim 3, wherein the processor is to further execute the first Web application code to:
   query the container of the first Web page for data models;
   request the second data model from the container;
   receive the second data model from the container;
   extract second data from the second data model; and
   present the second data in the first Web page.

5. A system according to claim 4, wherein the first data is presented in a first portion of the first Web page associated with the second Web application and the second data is presented in a second portion of the first Web page associated with the first Web application.

6. A system according to claim 1, wherein the first Web application code is received from a first Web server, and the second Web application code is received from a second Web server.

7. A method executed by a computing system, the method comprising:
   receiving first Web application code for a first Web page, the first Web application configured to display information within a first allocated portion of the first Web page;
   receiving second Web application code for the first Web page, the second Web application configured to display information within a second allocated portion of the first Web page;
   executing the first Web application code to register a first data model in a container of the first Web page; and
   executing the second Web application to:
   query the container registered by the first Web application for data models;
   request the first data model from the container;
   receive the first data model from the container;
   extract first data from the first data model; and
   present the first data in the second allocated portion of the first Web page.

8. A method according to claim 7, further comprising executing the first Web application code to:
   receive the first data to populate the first data model.

9. A method according to claim 7, further comprising executing the second Web application to:
   register a second data model in the container.

10. A method according to claim 9, further comprising executing the first Web application code to:
    query the container of the first Web page for data models;
    request the second data model from the container;
    receive the second data model from the container;
    extract second data from the second data model; and
    present the second data in the first Web page.

11. A method according to claim 10, wherein the first data is presented in a first portion of the first Web page associated with the second Web application and the second data is presented in a second portion of the first Web page associated with the first Web application.

12. A method according to claim 7, wherein the first Web application code is received from a first Web server, and the second Web application code is received from a second Web server.

13. A non-transitory computer-readable medium storing program code, the program code executable by a processor of a computing system to cause the computing system to:
receive first Web application code for a first Web page from a first Web server, the first Web application configured to display information within a first allocated portion of the first Web page;
receive second Web application code for the first Web page from a second Web server, the second Web application configured to display information within a second allocated portion of the first Web page;
execute the first Web application code to:
register a first data model in a container of the first Web page; and
execute the second Web application to:
query the container registered by the first Web application for data models;
request the first data model from the container;
receive the first data model from the container;
extract first data from the first data model; and
present the first data in the second allocated portion of the first Web page.

14. A medium according to claim 13, wherein execution of the first Web application code comprises:
reception of the first data to populate the first data model.

15. A medium according to claim 13, execution of the second Web application comprises:
registration of a second data model in the container.

16. A medium according to claim 15, the program code further executable by a processor of a computing system to cause the computing system to:
query the container of the first Web page for data models;
request the second data model from the container;
receive the second data model from the container;
extract second data from the second data model; and
present the second data in the first Web page.

17. A medium according to claim 16, wherein the first data is presented in a first portion of the first Web page associated with the second Web application and the second data is presented in a second portion of the first Web page associated with the first Web application.

* * * * *